(12) United States Patent
Kim et al.

(10) Patent No.: US 9,084,163 B2
(45) Date of Patent: Jul. 14, 2015

(54) APPARATUS AND METHOD FOR PERFORMING CARRIER SWITCHING OPERATION FOR E-MBS SERVICE IN MULTICARRIER SYSTEM

(75) Inventors: Jeongki Kim, Gyeonggi-do (KR); Kiseon Ryu, Gyeonggi-do (KR); Youngsoo Yuk, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/519,771
(22) PCT Filed: Jan. 12, 2011
(86) PCT No.: PCT/KR2011/000212
§ 371 (c)(1), (2), (4) Date: Jun. 28, 2012
(87) PCT Pub. No.: WO2011/087269
PCT Pub. Date: Jul. 21, 2011

(65) Prior Publication Data
US 2012/0287837 A1    Nov. 15, 2012

Related U.S. Application Data

(60) Provisional application No. 61/294,115, filed on Jan. 12, 2010, provisional application No. 61/324,274, filed on Apr. 14, 2010, provisional application No. 61/329,516, filed on Apr. 29, 2010, provisional application No. 61/362,290, filed on Jul. 7, 2010.

(30) Foreign Application Priority Data

Dec. 21, 2010   (KR) .................. 10-2010-0131886

(51) Int. Cl.
*H04W 36/06* (2009.01)
*H04W 72/00* (2009.01)
(Continued)

(52) U.S. Cl.
CPC ............. *H04W 36/06* (2013.01); *H04W 4/12* (2013.01); *H04W 36/0072* (2013.01); *H04W 72/005* (2013.01)

(58) Field of Classification Search
CPC ......... H04W 4/06; H04W 4/00; H04W 24/02; H04W 72/005; H04W 68/00; H04J 1/00; H04J 3/24; H04J 3/26; H04L 12/56; H04B 7/00
USPC .......................... 370/312, 328–338, 431–463
See application file for complete search history.

(56) References Cited

U.S. PATENT DOCUMENTS 8,565,065 B2 * 10/2013 Cheng et al. .................. 370/210
2003/0088695 A1   5/2003 Kwak et al.
(Continued)

FOREIGN PATENT DOCUMENTS

CN   101166079 A   4/2008
CN   101621359 A   1/2010
(Continued)

OTHER PUBLICATIONS

Kim et al., "E-MBS Operation on Multicarrier Deployment in IEEE P802.16m (16.9.2)," IEEE C802.16 Broadband Wireless Access Working Group <http://ieee802.org/16>, Jul. 9, 2010, pp. 1-12.
(Continued)

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

Disclosed is a method for performing a carrier switching operation in the perspective of a terminal in a multicarrier system, the method including establishing an enhanced-multicast broadcast service (E-MBS) service connection with a base station for E-MBS service reception, sending an E-MBS report message to the base station in the E-MBS service connected state with the base station, the E-MBS report message including connection information related to E-MBS channels, which the terminal is receiving or E-MBS channels, which the terminal intends to receive, receiving an E-MBS response message from the base station in response to the E-MBS report message, and performing a carrier switching operation for the E-MBS service reception based upon unicast available interval information included in the E-MBS response message.

23 Claims, 6 Drawing Sheets

(51) Int. Cl.
*H04W 4/12* (2009.01)
*H04W 36/00* (2009.01)

(56) References Cited

U.S. PATENT DOCUMENTS

| | | |
|---|---|---|
| 2003/0194992 A1 | 10/2003 | Kim et al. |
| 2004/0125768 A1 | 7/2004 | Yoon et al. |
| 2006/0080727 A1 | 4/2006 | Hammons et al. |
| 2006/0116123 A1 | 6/2006 | Purnadi et al. |
| 2006/0223574 A1 | 10/2006 | Chandra |
| 2006/0239265 A1* | 10/2006 | Son et al. ............ 370/390 |
| 2006/0258308 A1 | 11/2006 | Fassbender |
| 2007/0153727 A1 | 7/2007 | McBeath et al. |
| 2008/0175264 A1* | 7/2008 | Qu et al. ............. 370/436 |
| 2008/0192675 A1* | 8/2008 | Kim et al. ............ 370/320 |
| 2008/0291817 A1 | 11/2008 | Gupta |
| 2009/0029710 A1 | 1/2009 | Ochiai et al. |
| 2009/0109890 A1* | 4/2009 | Chow et al. ........... 370/312 |
| 2009/0185632 A1* | 7/2009 | Cai et al. ............. 375/260 |
| 2009/0296665 A1 | 12/2009 | Provvedi et al. |
| 2009/0305712 A1* | 12/2009 | Franceschini et al. ...... 455/450 |
| 2010/0048225 A1* | 2/2010 | Kwak et al. ............ 455/458 |
| 2010/0097973 A1* | 4/2010 | Wu et al. ............. 370/312 |
| 2010/0111023 A1* | 5/2010 | Pelletier et al. ......... 370/329 |
| 2010/0220673 A1 | 9/2010 | Hui et al. |
| 2010/0220674 A1 | 9/2010 | Fu |
| 2010/0272051 A1 | 10/2010 | Fu et al. |
| 2010/0302989 A1 | 12/2010 | Sung et al. |
| 2012/0294222 A1 | 11/2012 | Kim et al. |

FOREIGN PATENT DOCUMENTS

| | | |
|---|---|---|
| CN | 102687439 A | 9/2012 |
| EP | 2028868 A1 | 2/2009 |
| JP | 8-242482 A | 9/1996 |
| KR | 10-0464351 B1 | 1/2005 |
| KR | 10-2007-0086714 A | 8/2007 |
| KR | 10-2009-0082159 A | 7/2009 |
| KR | 10-2010-0043027 A | 4/2010 |
| KR | 10-0981533 B1 | 9/2010 |
| WO | WO 2005/109916 A2 | 11/2005 |

OTHER PUBLICATIONS

Kim et al., "Proposed Text on the E-MBS Operation Supporting Carrier Switch Mode in IEEE P802.16m (16.9.2)," IEEE C802.16 Broadband Wireless Access Working Group <http://ieee802.org/16>, Apr. 30, 2010, pp. 1-5.

Kim et al., "Proposed Text for E-MBS Operation for Carrier Switching Mode (16.2.3/16.9.2.2)," IEEE C802.16 Broadband Wireless Access Working Group <http://ieee802.org/16>, IEEE C802.16m-10/1005, Aug. 12, 2010, 9 pages.

Kim et al., "Proposed Text on the E-MBS Operation in Alternative Carrier in IEEE P802.16m (16.9.2)," IEEE C802.16 Broadband Wireless Access Working Group <http://ieee802.org/16>, IEEE C802.16m-10/0191, Mar. 5, 2010, 4 pages.

Li et al., "Proposed Text for E-MBS Operation for Multicarrier Deployment (P802.16m/D2-15.9.2.1)," IEEE C802.16 Broadband Wireless Access Working Group <http://ieee802.org/16>, IEEE C802.16m-09/2493, Nov. 6, 2011, 4 pages.

"Part 16: Air Interface for Fixed and Mobile Broadband Wireless Access Systems", IEEE P802, 16m/D4, Feb. 3, 2010, pp. 144-145 and 232.

Roshni Srinivasan et al., "IEEE 802.16m System Description Document (SDD)", IEEE 802.16m-09/0034r2, pp. 1-163, Sep. 24, 2009.

\* cited by examiner

APPARATUS AND METHOD FOR PERFORMING CARRIER SWITCHING OPERATION FOR E-MBS SERVICE IN MULTICARRIER SYSTEM

CROSS REFERENCE TO RELATED APPLICATIONS

This application is the National Phase of PCT/KR2011/000212 filed on Jan. 12, 2011, which claims priority under 35 U.S.C. §119(e) to U.S. Provisional Application Nos. 61/294,115 filed on Jan. 12, 2010, 61/324,274 filed on Apr. 14, 2010, 61/329,516 filed on Apr. 29, 2010, 61/362,290 filed on Jul. 7, 2010 and under 35 U.S.C. §119(a) to Patent Application No. 10-2010-0131886 filed in the Republic of Korea on Dec. 21, 2010, all of which are hereby expressly incorporated by reference into the present application.

TECHNICAL FIELD

This specification relates to a multi-carrier mode in a broadband wireless access system, and more particularly, an apparatus and method for performing an effective carrier switching operation for an enhanced-multicast broadcast service (E-MBS) service.

BACKGROUND ART

General Multicarrier System

A multicarrier system described herein indicates that one or more individual carriers are used as a group. FIGS. 1(A) and 1(B) show a signal transmission and reception method based upon a multiband radio frequency (RF).

For efficient use of multiband (or multicarrier), a technique has been proposed in which one medium access control (MAC) entity handles multiple carriers (e.g., several frequency allocation (FA)).

As shown in FIG. 1, one MAC layer in each of a transmitting end and a receiving end may manage several carriers for efficient multicarrier use. Here, for effective transmission and reception of the multicarrier, it is assumed that both the transmitting and receiving ends can transmit and receive multicarrier. Since frequency carriers (FCs) managed by one MAC layer do not have to be contiguous to one another, it may be flexible in view of resource management.

That is, a contiguous aggregation and a non-contiguous aggregation are all available.

Referring to FIGS. 1(a) and 1(b), PHY0, PHY1, . . . , PHY n−2, PHY n−1 denote multiband according to this technique, and each band may have a magnitude (bandwidth) of FA assigned for a specific service according to a predefined frequency policy.

For example, PHY0 (RF carrier 0) may have a bandwidth of FA assigned for a typical FM radio broadcast, and PHY1 (RF carrier 1) may have a bandwidth of FA assigned for cellular phone communications.

Each frequency band may have a different frequency bandwidth according to each frequency band characteristic. However, it may be assumed in the following description, for the sake of brief explanation, that each FA has A [MHz] magnitude.

Also, each FA may be represented as a carrier frequency for using a baseband signal at each frequency band. Hereinafter, each FA is referred to as "carrier frequency band" or, if not ambiguous, simply as "carrier" representing each carrier frequency band.

As shown in 3GPP LTE-A in recent time, to distinguish the carrier from a subcarrier used in a multicarrier technique, the carrier may be referred to as "component carrier."

In this regard, the "multiband" technique may be referred to as "multicarrier" technique or "carrier aggregation" technique.

In order to send signals via multiband as shown in FIG. 1(a) and receive signals via the multiband as shown in FIG. 1(b), the transmitting and receiving ends are required to include RF modules, respectively, for transmission and reception of signals over the multiband. Also, in FIG. 1, the configuration of "MAC" may be decided by a base station regardless of downlink (DL) and uplink (UL).

Briefly explaining, this technique indicates that one MAC entity (hereinafter, simply referred to as "MAC" if not obscure) manages/runs a plurality of RF carriers (radio frequencies) for signal transmission and reception. Also, the RF carriers managed by the one MAC may not have to be continuous to each other. Hence, in accordance with this technique, it is more flexible in view of resource management.

In IEEE 802.16m system as one of wireless communication systems, the carriers may be divided into two carrier types from the perspective of a base station. For example, the carrier types may be divided into a fully configured carrier type (FCCT) and a partially configured carrier type (PCCT).

The FCCT indicates a carrier by which every control information and data can be sent or received, and the PCCT indicates a carrier by which only downlink (DL) data can be sent or received. Here, the PCCT may be used for services, such as an enhanced multicast broadcast service (E-MBS), which usually provides DL data.

From the perspective of a mobile terminal, assigned carriers may be divided into two types, for example, a primary carrier type and a secondary carrier type. Here, the mobile terminal may be allocated with one primary carrier and a plurality of sub-carriers from the base station.

The primary carrier may be selected from the fully configured carriers. Most of essential control information related to the mobile terminal may be sent on the primary carrier. The subcarriers may be selected from the fully configured carriers or the partially configured carriers, and also additionally allocated in response to request of the mobile terminal or instruction of the base station.

The mobile terminal may send and receive not only every control information but also control information related to the subcarriers over the primary carrier, and exchange (transceive) data with the base station over the subcarriers. Here, the subcarrier, as a fully configured carrier, allocated to a specific mobile terminal, may be set to a primary carrier of another mobile terminal.

Multicarrier Switching

Multicarrier switching indicates a multicarrier mode for a terminal to switch a physical layer connection from a primary carrier to a partially configured subcarrier or a fully configured subcarrier. Here, the carrier switching of the terminal may be performed based upon instruction (indication) from a base station in order to receive E-MBS service at a subcarrier.

After being connected to the subcarrier for a specific time, the terminal may come back to the primary carrier. While the terminal is connected to the subcarrier for the specific time, the terminal does not have to maintain transmission or reception via the primary carrier.

Basic Multicarrier (MC) Mode

A basic multicarrier (MC) mode indicates a mode that a terminal operates using only one carrier. However, the terminal may support not only optimized scanning for carriers related to a multicarrier operation but also a primary carrier switching procedure.

Carrier Switching Operation for E-MBS Service

E-MBS service may be performed by a specific carrier (e.g., subcarrier) other than a primary carrier. In a connected state with a base station, an E-MBS terminal having only one transceiver (i.e., a terminal operating in a carrier switching mode) may perform carrier switching from a primary carrier to another carrier to receive E-MBS data burst, E-MBS configuration message and E-MBS MAP, and carrier switching from the another carrier to the primary carrier to receive a unicast service from the base station.

The E-MBS terminal may perform a carrier switching operation based upon its E-MBS subscription information assigned from the base station to the terminal during a dynamic service addition (DSA) procedure. The E-MBS subscription information may be MSTIDs and FIDs, for example.

In an actual E-MBS environment, basic (default) E-MBS channels may be assigned (allocated) to every terminals subscribed in the E-MBS service, and the number of default E-MBS channels may be much more than the number of specific E-MBS channels (e.g., premium channels).

all the E-MBS terminals subscribe in all the default contents via default free channels.

Additionally, some premium users may subscribe in premium contents.

In other words, E-MBS terminals subscribed in the premium contents may stay longer in the E-MBS carrier than terminals merely subscribed in the default contents.

FIG. 2 is a flowchart showing a carrier switching operation performed based upon terminal subscription information.

As shown in FIG. 2, it is assumed that a terminal 1 merely subscribed in default contents and a terminal 2 subscribed in the default contents and a premium content 2.

It is also assumed that E-MBS data bursts 1 and 3 are data for the default contents, E-MBS data burst 2 is data for a premium content 1, and E-MBS data bursts 4 and 5 are data for the premium content 2.

Referring to FIG. 2, the terminal 1 may stay at a primary carrier while a base station sends E-MBS data bursts 2, 4 and 5 (S201), and the terminal 2 may stay at a primary carrier while the base station sends E-MBS data burst 2 (S202). That is, the base station may allocate unicast resources to terminals, which have subscribed in the premium contents having the lowest unicast scheduling efficiency.

During free E-MBS service, a terminal may not need to perform a joining/leaving process at an upper layer. That is, in this case, when E-MBS terminal starts or ends E-MBS service reception, DSA/dynamic service deletion (DSD) process may not be performed. However, in the carrier switching mode, the base station must be known of whether a terminal is receiving the E-MBS service for efficient unicast scheduling. If the terminal is not receiving the E-MBS service, the base station may provide the unicast service to the terminal at the primary carrier at any time.

DISCLOSURE OF INVENTION

Solution to Problem

Therefore, an aspect of the detailed description is to provide an apparatus and method for performing an effective carrier switching operation by indicating (allowing) a terminal to report connection information related to E-MBS channels for E-MBS service reception in a multicarrier system.

Another aspect of the detailed description is to provide a method for indicating to a terminal, which performs a carrier switching operation, as to whether or not the terminal should report connection information related to E-MBS channels.

To achieve these and other advantages and in accordance with the purpose of this specification, as embodied and broadly described herein, there is provided a method for performing a carrier switching operation in the perspective of a terminal in a multicarrier system, the method including establishing an enhanced-multicast broadcast service (E-MBS) service connection with a base station for E-MBS service reception, sending an E-MBS report message to the base station in the E-MBS service connected state with the base station, the E-MBS report message including connection information related to E-MBS channels, which the terminal is receiving or E-MBS channels, which the terminal intends to receive, receiving an E-MBS response message from the base station in response to the E-MBS report message, and performing a carrier switching operation for the E-MBS service reception based upon unicast available interval information included in the E-MBS response message.

The connection information may be sent by being included in the E-MBS report message when an E-MBS channel is changed.

The change of the E-MBS channel may be that the E-MBS channel is changed to a channel other than E-MBS channels that the terminal is monitoring.

The connection information related to the E-MBS channels intended to be received may be included in the E-MBS report message upon a change to another channel other than the E-MBS channels that the terminal is monitoring.

The connection information may be represented in a format of a list of E-MBS service IDs and FIDs, and comprise a field indicating the number of E-MBS IDs and FIDs and a field indicating the E-MBS ID and FID.

The E-MBS service connected state may be a carrier switching mode of performing a carrier switching operation between a primary carrier and a subcarrier for the E-MS service reception.

A DSA response message or unsolicited DSA request message received from the base station may further include carrier switching mode information indicating whether or not the terminal should perform the E-MBS channel report.

The carrier switching mode information may be information indicating execution of the carrier switching operation based upon the unicast available interval information received through the DSA procedure with the base station or based upon the E-MBS service connection information report.

When the carrier switching mode information indicates the execution of the carrier switching operation based upon the E-MBS service connection information report, the E-MBS report message may be sent to the base station.

The method may further include receiving a first message from the base station, the first message including an E-MBS service connection information report indicator.

When an E-MBS channel being received by the terminal is changed, the E-MBS service connection information report indicator may indicate whether or not the terminal should report the changed channel information to the base station.

The method may further include sending a response to the first message to the base station.

This specification may provide a terminal of performing a carrier switching operation in a multicarrier system, the terminal including a transmitting unit configured to send an E-MBS report message to a base station after establishing an E-MBS service connection with the base station, the E-MBS report message including connection information related to E-MBS channels that the terminal is currently receiving or intends to receive, a receiving unit configured to receive an E-MBS response message from the base station responsive to the E-MBS report message, and a controller configured to perform a carrier switching operation for E-MBS service reception, based upon unicast available interval information included in the E-MBS response message.

When an E-MBS channel being monitored by the terminal is changed, the controller may control the transmitting unit to send the E-MBS report message by including the changed channel connection information.

The receiving unit may receive from the base station a DSA response message or unsolicited DSA request message, which includes carrier switching mode information indicating whether or not the terminal should perform the E-MBS channel report.

Advantageous Effects of Invention

In a multicarrier system, connection information related to E-MBS channels, which a terminal in a carrier switching mode intends to receive, may be sent to a base station, which results in reduction of overhead, caused due to reporting the connection information related to the E-MBS channels to the base station every time the E-MBS channel is changed.

Also, a connection information report for the E-MBS channels by the terminal may allow the base station to provide the terminal with an efficient unicast scheduling.

MODE FOR THE INVENTION

Figure 1A:
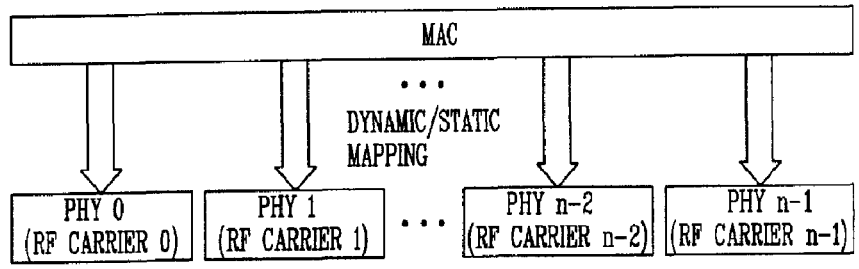
FIGS. 1(a) and 1(b) are views showing a signal transmission and reception method based upon a multiband radio frequency (RF)
Figure 1B:
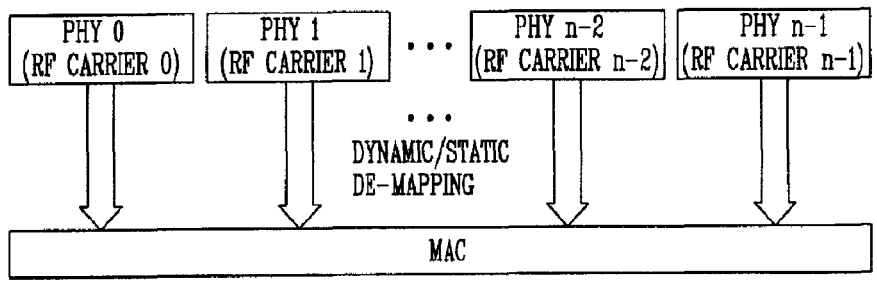
Figure 2:
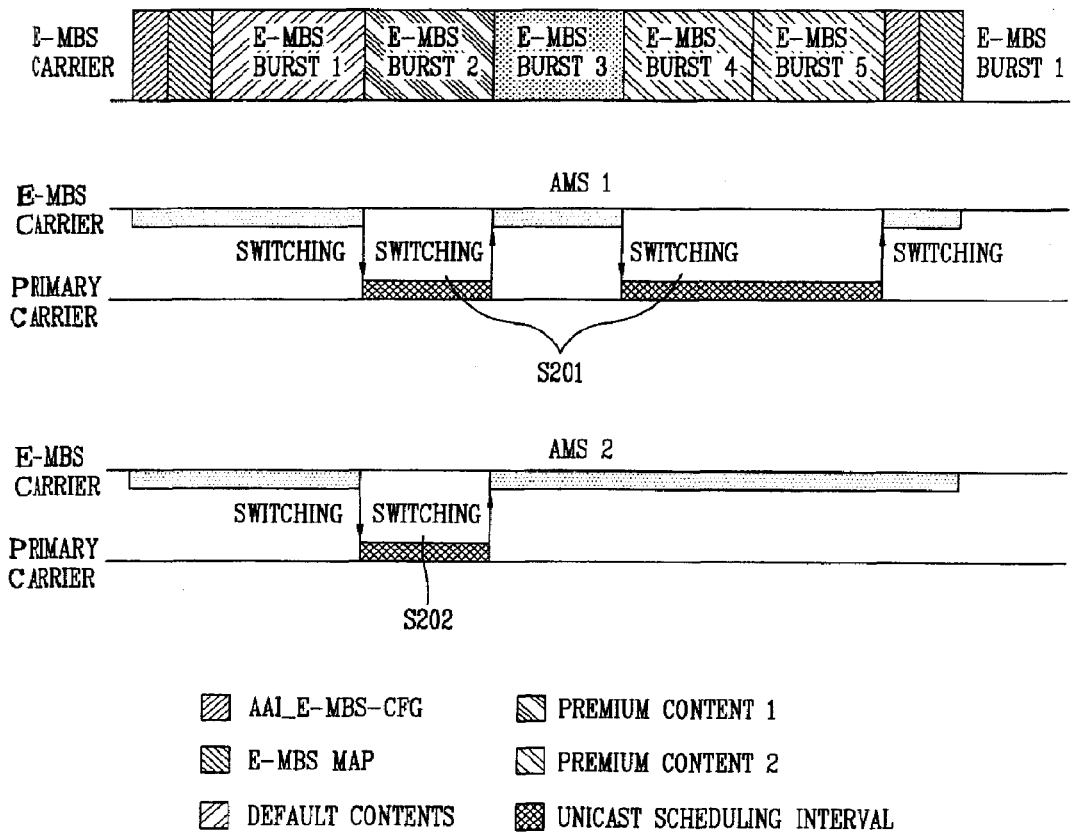
FIG. 2 is a flowchart showing a carrier switching operation performed based upon terminal subscription information.

Reference will now be made in detail to the preferred embodiments of this specification, examples of which are illustrated in the accompanying drawings. It should be understood that the description herein will be given of essential parts required to understand operations according to this specification and description of the other parts will be omitted to obviate obscurity of the point of the invention.

This specification proposes an apparatus and method for providing an emergency service in a communication system, for example, which employs Institute of Electrical and Electronics Engineers (IEEE) 802.16 standard (hereinafter, referred to as 'IEEE 802.16 communication system).

The detailed description will be given of an apparatus and method for providing an emergency service, for example, in the IEEE 802.16 communication system. However, the apparatus and method for providing the emergency service given by the detailed description may also be applicable to other communication systems as well as the IEEE 802.16 communication system.

The exemplary embodiments herein are combinations of components and characteristics in certain forms. Each component or characteristic should be considered to be optional unless being explicitly described. Each component or characteristic may be embodied in the form of non-combination with other components or characteristics. Also, the exemplary embodiments can be implemented by combination of part of components and/or characteristics. The sequence of operations described in the exemplary embodiments may differ. Part of configurations or characteristics in one exemplary embodiment will be included in another exemplary embodiment, or be replaced with corresponding configurations or characteristics in another embodiment.

The exemplary embodiments in this specification are described herein on the basis of relation of data transmission and reception between a base station and a terminal. Here, the base station may indicate a terminal node of a network, which performs communications directly with the terminal. Specific operations, which will be described as being performed by the base station in this specification, may be performed by an upper node of the base station.

That is, it is obvious that in a network comprising a plurality of network nodes including the base station, various operations performed for communications with the terminal can be performed by the base station or different network nodes other than the base station. 'Base station' will be replaced with other terms, such as a fixed station, Node B, eNode B (eNB), access point and the like. Also, 'terminal' may be replaced with other terms, such as user equipment (UE), mobile station (MS), mobile subscriber station (MSS) and the like.

The exemplary embodiment described herein may be embodied by various means. For example, the exemplary embodiments may be implemented by hardware, firmware, software, or combination of them.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors.

For firmware or software implementation, the method according the exemplary embodiments described herein may be implemented in the form of module, procedure, function or the like, which performs functions or operations described above. Software codes may be stored in a memory unit to be operated by a processor. The memory unit may be present inside or outside the processor, to exchange (transceiver) data with the processor via various means, which have been already known.

Specific terms used in the following description are provided for better understanding of the specification, and use of such terms may be changed into different forms within the scope of this invention.

This specification provides a method for effectively assigning unicast service resources from a base station to a terminal by making a terminal report to the base station connection information related to E-MBS service channels, which the terminal intends to receive (i.e., the terminal can receive later based upon E-MBS subscription).

First Exemplary Embodiment

The first exemplary embodiment illustrates a method for performing a carrier switching operation. That is, a terminal reports to a base station connection information related to E-MBS service channels, which the terminal intends to receive, namely, expects to receive later, based upon E-MBS service subscription information, and accordingly the base station allocates a unicast resource to the terminal such that the terminal can perform the carrier switching operation.

Figure 3:
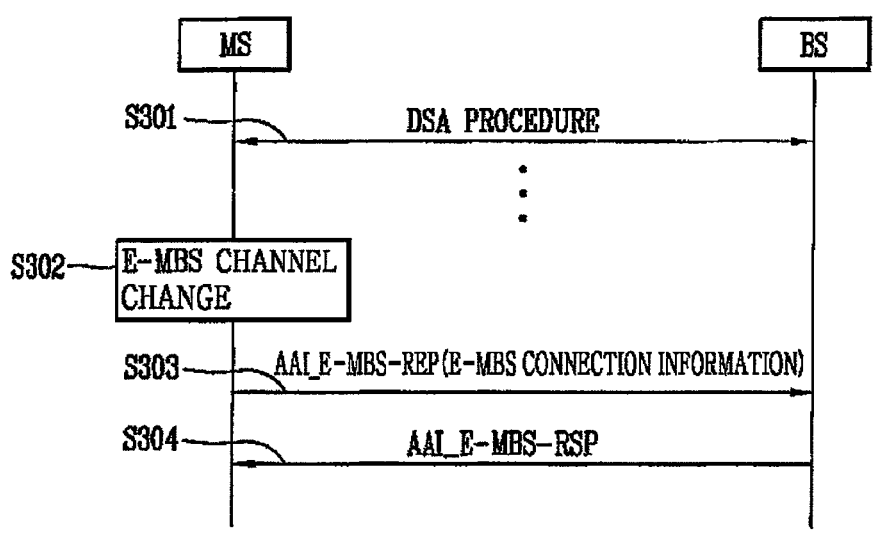
FIG. 3 is a flowchart showing a procedure that a terminal performs a carrier switching operation in accordance with a first exemplary embodiment.

FIG. 3 is a flowchart showing a procedure that a terminal performs a carrier switching operation in accordance with a first exemplary embodiment.

A terminal may perform a dynamic service addition (DSA) procedure for establishing E-MBS service connection with a base station (S301). Here, the terminal may perform the DSA procedure with the base station to exchange information needed for E-MBS service connection and reception.

That is, the terminal may send DSA-REQ message to the base station to establish the E-MBS service connection. Here, the DSA-REQ message may alternatively be sent from the base station to the terminal for the E-MBS connection establishment. That is, the base station may send unsolicited DSA-REQ message to the terminal.

The base station may send DSA-RSP message to the terminal in response to the E-MBS service connection request. Here, when the base station sends the unsolicited DSA-REQ message to the terminal, the terminal may send DSA-RSP message to the base station in response to the E-MBS service connection request.

Also, the DSA-RSP message or unsolicited DSA-REQ message received by the terminal may include carrier switching mode information. The carrier switching mode information may indicate a carrier switching operation based upon a unicast available interval included in the DSA message or a carrier switching operation based upon parameters using an E-MBS report message.

During the DSA procedure between the terminal and the base station, other messages required for the DSA procedure as well as the DSA-REQ message and the DSA-RSP message may also be sent or received.

The terminal may become a state capable of receiving the E-MBS service from the base station through the DSA procedure with the base station.

That is, if the terminal, which subscribed in the E-MBS service, is in a connected mode with the base station, the terminal can receive the E-MBS service from the base station by performing the carrier switching operation.

Next, the terminal may send E-MBS report message including E-MBS connection information to the base station (S303).

Here, the E-MBS report message may be sent from the terminal to the base station in the following three cases (i.e., E-MBS service reception start/change/end) to report those cases.

1. A case where a terminal requests a carrier switching start time from a base station for switching to E-MBS carrier after DSx transaction.

2. A case where a terminal updates information related to the currently receiving E-MBS stream when a carrier switching mode within AAI_DSA-REQ/RSP message is set to '1b1.'

3. A case where a terminal informs of an end time of an E-MBS carrier switching operation without releasing E-MBS connection allocated via AAI_DSA-REQ/RSP message.

Also, the E-MBS connection information may indicate at least one of connection information related to E-MBS channels, which the terminal is currently receiving (for example, E-MBS IDs and FIDs), and connection information related to E-MBS channels, which the terminal can receive later, namely, intends to receive, based upon the E-MBS service subscription. That is, the E-MBS connection information may indicate information as to which E-MBS service the terminal is receiving or intends to receive.

The E-MBS connection information may be included in any E-MBS report message, which the terminal sends to report start, change or end of E-MBS service reception. Also, the E-MBS connection information may be sent by being included in another control message, different from the E-MBS report message, sent from the terminal to the base station to notify the start of E-MBS service reception.

The E-MBS connection information may be sent by being included in the E-MBS report message, according to a connected state of E-MBS channel of the terminal after a preset time, after the terminal sends the E-MBS report message to report the start of the E-MBS service reception.

Hereinafter, description will be given in detail of a case where when E-MBS channel being received by a terminal is changed based upon E-MBS subscription in an E-MBS connected mode between the terminal and the base station, E-MBS connection information is included in E-MBS report message, which is sent to the base station for reporting the change.

Upon an E-MBS channel being changed, the terminal may send E-MBS report message (AAI_E-MBS-REP) to the base station to report the change of the E-MBS channel that the terminal is currently receiving (S303).

The E-MBS report message may include E-MBS channel connection information. Here, the terminal may report connection information related to E-MBS channels (for example, E-MBS IDs and FIDs) to the base station via the E-MBS REP message based upon E-MBS service subscription.

Here, the connection information related to the E-MBS service channels may indicate at least one of connection information related to E-MBS channels, which the terminal is currently receiving (for example, E-MBS IDs and FIDs), and connection information related to E-MBS channels, which the terminal can receive later based upon the E-MBS service subscription.

The changes of the E-MBS channel that the terminal is currently receiving may be divided into a change of E-MBS channel, which belongs to the E-MBS channels reported to the base station, and a change of E-MBS channel, which does not belong to the E-MBS channels reported to the base station.

Here, based upon the connection information related to the channels reported to the base station, if a channel is changed within the corresponding information, the terminal may not separately report connection information related to the changed channel to the base station.

On the contrary, if a channel is changed to another channel, which is not indicated by the channel connection information reported to the base station, the terminal may also notify the base station of connection information related to channels, which are to be received later, as well as connection information related to the changed channel.

As such, when both the connection information related to the channels to be receivable later and the connection information related to the currently received channels are notified to the base station, it may be possible to reduce overhead due to reporting the channel connection information to the base station every time a channel is changed.

That is, whether or not to send to the base station the connection information related to the channels, which the terminal intends to receive, by including in E-MBS REP message may be decided based upon whether or not a channel is changed to another channel, which is not included in channels whose connection information reported to the base station.

For example, it is assumed that a terminal has been allocated E-MBS related channel information from 1 to 36 through a DSA procedure with the base station.

The terminal may group the channels allocated from the base station into two groups for channel information report (for example, a first group of 1~16 channels and a second group of 17~36 channels).

Here, after reporting to the base station on channel connection information related to the first group of channels, which the terminal is monitoring, if a changed channel belongs to the first group, the terminal may not separately report information related to the changed channel to the base station.

However, if the changed channel belongs to the second group (for example, if channel 14 is changed to channel 18), the terminal may report connection information related to the channel belonging to the second group to the base station.

Table 1 shows an exemplary format of AAI_E-MBS REP message, which is used to report to the base station E-MBS connection information related to channels, which the terminal is receiving, and channels, which the terminal intends to receive later.

TABLE 1

| Syntax | Size (Bit) | Notes | Conditions |
|---|---|---|---|
| AAI_E-MBS-REP_Message_Format ( ) { | | | |
| MAC Control Message Type | 8 | AAI _E-MBS-REP | |
| E-MBS Zone ID | 7 | | |
| Report mode | 2 | Indicates the AMS starts/changes/ ends E-MBS 0b00: AMS requests ABS to assign a carrier switching start time (AMS starts receiving the E-MBS data) 0b01: AMS updates E-MBS connection Bitmap 0b10: AMS ends E-MBS carrier switching (AMS ends receiving the E-MBS data) 0b11: reserved | |
| E-MBS connection information ... | Variable ... | Indicates which E-MBS service(s) the AMS intends to receive ... | |

Referring to Table 1, the E-MBS connection information indicates which E-MBS service(s) the terminal intends to receive. That is, when the currently receiving E-MBS channel is changed, the terminal may send the E-MBS REP message to the base station by including connection information on the currently receiving E-MBS channel and connection information on E-MBS channel which is intended to be received later (in the near future). The connection information related to the E-MBS channel that the terminal intends to receive later may be known based upon the E-MBS service subscription of the terminal.

Also, the E-MBS connection information included in the E-MBS REP message may be represented in a format of a list or a bitmap of E-MBS IDs and FIDs.

Table 2 shows an exemplary format of AAI_E-MBS-REP message, in which the E-MBS connection information is represented in the format of a list of E-MBS IDs and FIDs.

TABLE 2

| Syntax | Size (Bit) | Notes | Conditions |
|---|---|---|---|
| AAI_E-MBS-REP_Message_Format ( ) { | | | |
| MAC Control Message Type | 8 | AAI _E-MBS-REP | |
| E-MBS Zone ID | 7 | | |
| Report mode | 2 | Indicates the AMS starts/changes/ends E-MBS 0b00: AMS requests ABS to assign a carrier switching start time (AMS starts receiving the E-MBS data) 0b01: AMS updates E-MBS connection Bitmap 0b10: AMS ends E-MBS carrier switching (AMS ends receiving the E-MBS data) 0b11: reserved | |
| Num of E-MBS IDs and FIDS | 4 | | Shall be included if the value of Report Mode is 0b01. |
| For (i = 0; i < Num of e-MBS IDs and FIDx; i++){ | Variable | Indicates which E-MBS service(s) the AMS intends to receive | |
| E-MBS ID and FID | 16 | | Shall be included if the value of Report Mode is 0b01. |
| ... | ... | ... | |

Referring to Table 2, E-MBS connection information may be included when the E-MBS REP message is for reporting the change of the E-MBS channel (e.g., when report mode is set to '0b01'). For reporting the E-MBS connection information to the base station, the E-MBS REP message may further include a field indicating the number of E-MBS IDs and FIDs, a field indicating which E-MBS service the terminal intends to receive if one or more E-MBS IDs and FIDs are present, and a field indicating ID and FID of each E-MBS channel connection.

That is, the terminal may send the E-MBS REP message to the base station by including E-MBS ID and FID to report to the base station.

Table 3 shows an exemplary format of AAI_E-MBS-REP message, in which the E-MBS connection information is represented in a bitmap format.

TABLE 3

| Syntax | Size (Bit) | Notes | Conditions |
|---|---|---|---|
| AAI_E-MBS-REP_Message_Format ( ) { | | | |
| MAC Control Message Type | 8 | AAI _E-MBS-REP | |
| E-MBS Zone ID | 7 | | |
| Report mode | 2 | Indicates the AMS starts/changes/ends E-MBS 0b00: AMS requests ABS to assign a carrier switching start time (AMS starts receiving 0b01: AMS updates E-MBS connection Bitmap 0b10: AMS ends E-MBS carrier switching (AMS ends receiving the E-MBS data) 0b11: reserved | |
| E-MBS connection information | 16 | Each bit of the bitmap represents an E_MBS connection for which service flows have been established using AAI_DSx transactions in one E-MBS Zone. The E-MBS service(s) are mapped in ascending order of their E-MBS ID+FID value from LSB to MSB of the bitmap. For each bit: Value 0: the AMS does not intend to receive the E-MBS service. Value 1: the AMS currently receives E-MBS or the AMS may switch to this service in the near future. | Shall be included if the value of Report Mode is 0b01. |
| ... | ... | ... | |

Referring to Table 3, the terminal may include the E-MBS connection information to report to the base station in the E-MBS REP message in the bitmap format so as to send the E-MBS REP message to the base station. Here, each bit may represent each E-MBS connection allocated to the terminal by the base station.

Next, the terminal may receive E-MBS response message (AAI_E-MBS-RSP) from the base station in response to the E-MBS report message (S304). The E-MBS RSP message may include unicast available interval information.

Here, the unicast available interval information may indicate information related to an interval (zone), in which the terminal can receive a unicast service from the base station via a primary carrier while performing a carrier switching operation.

That is, upon receiving the E-MBS REP message including connection information related to E-MBS channel, which the terminal intends to receive, the base station may send AAI_E-MBS-RSP message to the terminal by including the unicast available interval information, which indicates which time interval is to be used to schedule the unicast service, based upon the E-MBS connection information sent by the terminal.

Thus, the terminal can receive the unicast service from the base station at a primary carrier during the unicast available interval, and the base station can send non-E-MBS data, namely, unicast data to the terminal at the primary carrier during the corresponding interval.

The unicast available interval information, which the base station assigns to the terminal via the AAI_E-MBS-RSP message, may indicate the start and end of each interval, as shown in Table 4.

Table 4 shows an exemplary format of E-MBS RSP message including the unicast available interval information.

TABLE 4

| Syntax | Size (Bit) | Notes | Conditions |
|---|---|---|---|
| AAI_E-MBS-REP_Message_Format ( ) { | | | |
| MAC Control Message Type | 8 | AAI _E-MBS-REP | |
| E-MBS Zone ID | 7 | | |
| Report mode | 2 | Indicates the AMS starts/changes/ends E-MBS 0b00: AMS requests ABS to assign a carrier switching start time (AMS starts receiving the E-MBS data) 0b01: AMS updates E-MBS connection Bitmap 0b10: AMS ends E-MBS carrier switching (AMS ends receiving the E-MBS data) 0b11: reserved | |
| Number of unicast available interval | 4 | Number of Unicast Available Intervals within an MSI (default = 1) | It will be present when Report Mode is 0b01. |
| Unicast available interval start | Variable | In unit of frames where n is Number of Unicast Available Intervals. The AMS stays at primary carrier from Unicast Available Interval Start to Unicast Available Interval End. MSI length==0b00: 3*n bits MSI length==0b01: 4*n bits MSI length==0b10: 5*n bits MSI length==0b11: 6*n bits | It will be present when Report Mode is 0b01. |
| Unicast available interval end | Variable | In unit of frames where n is Number of Unicast Available Intervals The AMS stays at primary carrier from Unicast Available Interval Start to Unicast Available Interval End. | It will be present when Report Mode is 0b01. |

TABLE 4-continued

| Syntax | Size (Bit) | Notes | Conditions |
|---|---|---|---|
| | | MSI length==0b00: 3*n bits MSI length==0b01: 4*n bits MSI length==0b10: 5*n bits MSI length==0b11: 6*n bits | |
| ... | ... | ... | |

Referring to Table 4, the unicast available interval information may include a field indicating the number of unicast available intervals, a start field of the unicast available interval, and an end field of the unicast available interval.

Table 5 shows an exemplary format of E-MBS RSP message, in which the unicast available interval information is represented in a bitmap format.

TABLE 5

| Syntax | Size (Bit) | Notes | Conditions |
|---|---|---|---|
| AAI_E-MBS-REP_Message_Format ( ) { | | | |
| MAC Control Message Type | 8 | AAI_E-MBS-REP | |
| E-MBS Zone ID | 7 | | |
| Report mode | 2 | Indicates the AMS starts/changes/ends E-MBS 0b00: AMS requests ABS to assign a carrier switching start time (AMS starts receiving the E-MBS data) 0b01: AMS updates E-MBS connection Bitmap and request ABS assign a carrier switching start time. 0b10: AMS E-MBS carrier switching (AMS ends receiving the E-MBS data) 0b11: reserved | |
| Unicast available interval Bitmap | Variable (maximum: 16) | Indicates when the AMS should be availabe in the primary carrier using N bits $b_0 b_1 b_2 \ldots b_{N-1}$ If $b_i==0$, then AMS is available for E-MBS data scheduling in secondary carrier. If $b_i==1$, then AMS is available for unicast scheduling in primary carrier. $N_{MSI} = 2$ superframes: N = 4 bits $N_{MSI} = 4$ superframes: N = 4 bits $N_{MSI} = 8$ superframes: N = 8 bits $N_{MSI} = 16$ superframes: N = 16 bits Depending on the $N_{MSI}$, the number of bits per subframe changes. If $N_{MSI} = 2$, then 2 frames per bit. If $N_{MSI} = 4, 8$ and 16, then 4 frames per bit. | It will be present when Report Mode is 0b01. |
| ... | ... | ... | |

Referring to Table 5, the unicast available interval information, which the base station sends to the terminal via AAI_E-MBS-RSP message, may be represented in a bit format.

The terminal may perform a carrier switching operation between a primary carrier and a subcarrier for receiving E-MBS service, based upon the unicast available interval information received from the base station.

Here, if the terminal needs to send E-MBS connection bitmap to the base station while it receives the E-MBS service, the terminal may set the Report Mode within the E-MBS REP message to '0b01,' other than '0b00,' thus to send the E-MBS REP message to the base station for reporting the start of the E-MBS service reception.

Upon receiving the AAI_E-MBS-REP message having the Report Mode set to '0b01' from the terminal, if the carrier switching mode of the terminal is in an off state, the base station may notify the start of the carrier switching mode to the terminal.

Here, the base station may send not only a carrier switching start time but also unicast available interval information to the terminal via the AAI_E-MBS-RSP message.

Second Exemplary Embodiment

The second exemplary embodiment illustrates a method in which a base station decides whether terminals in a carrier switching mode can report connection information related to E-MBS channels, through DSx procedure, based upon E-MBS service subscription information.

Figure 4:
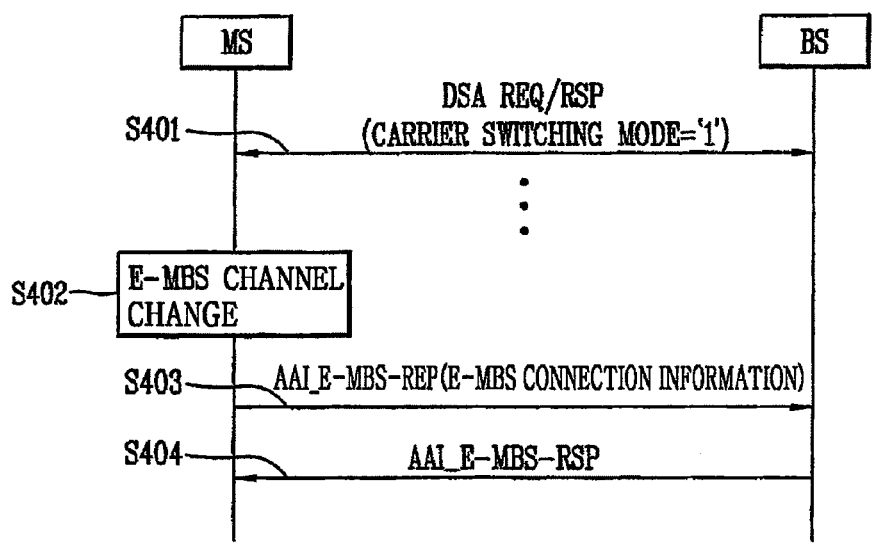
FIG. 4 is a flowchart showing a procedure of reporting E-MBMS channel connection information in accordance with a second exemplary embodiment.

FIG. 4 is a flowchart showing a procedure of performing a connection information report with respect to E-MBS channels in accordance with a second exemplary embodiment.

That is, in accordance with the second exemplary embodiment, when a base station assigns connection information related to E-MBS channels to the terminal through the DSA procedure, as terminals in the carrier switching mode subscribe in the E-MBS in a connected mode, the base station may inform whether the terminals can report changes of the E-MBS channels when the changes happen.

As one example, if one terminal has subscribed in one or two E-MBS channels, the base station may schedule an appropriate unicast to the terminal even without an E-MBS channel report of the terminal.

That is, while performing the DSA procedure with the base station, the terminal may decide whether to perform a channel report to the base station based upon carrier switching mode information included in an unsolicited DSA REQ message or DSA RSP message sent by the base station, thereby performing the carrier switching operation.

Hereinafter, a step of sending DSA REQ/RSP message including the carrier switching mode information will be described (S401).

Steps S402 to S404 succeeding S401 are the same as S302 to S304, so description thereof will be omitted.

First, the terminal may send DSA-REQ message to the base station for establishing E-MBS service connection. Here, the DSA-REQ message may be sent from the base station to the terminal for the E-MBS connection establishment. That is, the base station may send an unsolicited DSA-REQ message to the terminal.

Afterwards, the base station may send DSA-RSP message to the terminal in response to the E-MBS service connection request.

Here, when the base station sends the unsolicited DSA-REQ message to the terminal, the terminal may send the DSA-RSP message to the base station in response to the E-MBS service connection request.

Also, the DSA-RSP message sent or received by the terminal (or received or sent by the base station) or the unsolicited DSA REQ message may include carrier switching mode information.

The carrier switching mode information may indicate a carrier switching based upon unicast available interval information included in the DSA message (i.e., unsolicited DSA REQ/DSA RSP message) or a carrier switching based upon parameters using the E-MBS RSP message.

Also, during the DSA procedure between the terminal and the base station, other messages required for the DSA procedure will be sent or received in addition to the DSA-REQ message and the DSA-RSP message.

Table 6 shows an exemplary format of the DSA-REQ (unsolicited DSA REQ/RSP message including carrier switching mode information.

TABLE 6

| Fields | Size (Bits) | Value/Notes | Conditions |
| --- | --- | --- | --- |
| ... | ... | ... | |
| Carrier switching mode | 1 | Indicates the type of carrier switching between E-MBS carrier to AMS's primary carrier.<br>- 0b0: carrier switching based on unicast available interval.<br>- 0b1; carrier switching based on the E-MBS connection report | It will be present when the MC capability of the AMS is carrier switching mode |

Referring to Table 6, as one example, when the carrier switching mode included in the DSA REQ/RSP message is '0b0,' the terminal may perform a carrier switching operation even without reporting the E-MBS connection information to the base station so as to receive a unicast resource from the base station. That is, even when the E-MBS connection information is not received from the terminal (i.e., when less E-MBS channels are changed), the base station may schedule a unicast resource to the terminal so as for the terminal to perform an effective carrier switching operation. Here, the base station may assign a unicast available interval to the terminal.

Also, when the carrier switching mode is set to '0b1,' the terminal may send the AAI_E-MBS-REP message to the base station to report information related to the currently receiving channels and information related to channels intended to be received later to the base station.

Based upon the E-MBS channel connection information, the base station may assign the unicast available interval information to the terminal via the AAI_E-MBS-RSP message. The terminal may thus perform the carrier switching operation based upon the assigned unicast available interval information.

Third Exemplary Embodiment

The third exemplary embodiment illustrates a method, in which a base station selectively instructs (indicates) a terminal as to whether or not it should report changed E-MBS connection information according to situations, without selection of a carrier switching mode via DSx (e.g., DSA) message, namely, without including carrier switching mode information in DSA REQ/RSP message.

Figure 5:
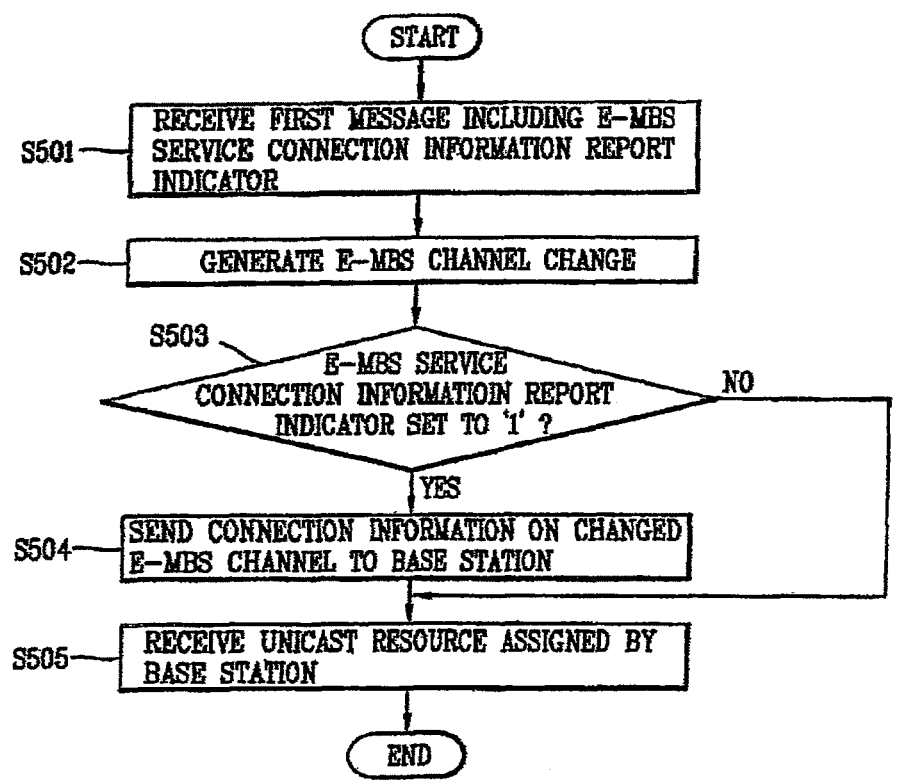
FIG. 5 is a flowchart showing sequential operations performed by a terminal in accordance with a third exemplary embodiment.

FIG. 5 is a flowchart showing terminal operations in accordance with a third exemplary embodiment.

First, a terminal may receive a first message including an E-MBS service connection information report indicator from a base station (S501). Here, the first message may be a broadcast message or a unicast message.

When the first message is a broadcast message, the first message may be E-MBS-CFG message or system configuration description (SCD) message.

Also, when the first message is a unicast message, the first message may be AAI_ECI-CMD message.

When an E-MBS channel, which the terminal is monitoring, is changed, the E-MBS service connection information report indicator indicates information that indicates whether or not the terminal should report the changed information to the base station.

Optionally, the terminal may send a response to the base station to inform of an acknowledgement for the first message sent by the base station.

Next, when any change has happened in the E-MBS channel (S502), the terminal may check the E-MBS service connection information report indicator included in the first message to decide whether or not to send connection information related to the changed E-MBS channel to the base station (S503).

As one example, if the E-MBS service connection information report indicator is set to '1,' the terminal reports the changed E-MBS channel to the base station (S504). Here, the base station may perform a unicast scheduling to the terminal based upon the connection information sent by the terminal so as to send a unicast resource to the terminal (S505).

Also, if the E-MBS service connection information report indicator is set to '0,' the terminal may not report the connection information related to the changed E-MBS channel to the base station. Here, the base station may send the scheduled unicast resource to the terminal based upon the E-MBS subscription information (S505).

Indication Via Broadcast Message

Figure 6:
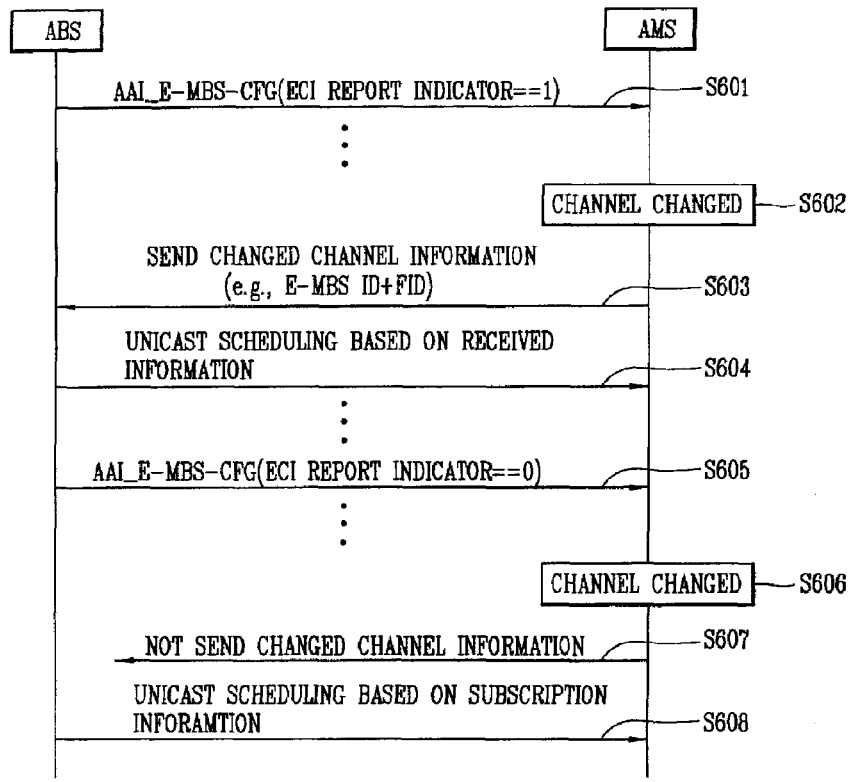
FIG. 6 is a flowchart showing that a base station sets on or off a channel report of a terminal using AAI_E-MBS-CFG in accordance with one exemplary embodiment.

FIG. 6 is a flowchart showing that a base station sets on or off a channel report of a terminal using AAI_E-MBS CFG in accordance with one exemplary embodiment.

First, if it is determined to have to receive information related to a changed channel from a terminal due to, for example, a unicast scheduling for the terminal, which is receiving E-MBS service, the base station may set an E-MBS connection information (ECI) report indicator included in a broadcast message (for example, AAI_E-MBS-CFG) to '1,' thereby sending the AAI_E-MBS-CFG message to the terminal (S601).

If the ECI report indicator included in the AAI_E-MBS-CFG message from the base station is set to '1,' when connection information related to an E-MBS channel, which the terminal is actually monitoring, has changed (S602), the terminal may report the changed E-MBS channel connection information to the base station (S603).

Upon reception of the changed channel connection information from the terminal, then the base station may assign a unicast resource to the terminal based upon the changed channel connection information (S604).

However, when the based station determines that it does not have to receive the changed channel information from the terminal, the base station may set the ECI report indicator included in the broadcast message (e.g., AAI_E-MBS-CFG) to '0,' for example (S605).

After the terminal receives the AAI_E-MBS-CFG having the ECI report indicator set to '0,' if its channel information has changed (S606), the terminal may not send E-MBS connection information to the base station (S607).

Here, the base station may assign the unicast resource to the terminal based upon E-MBS subscription information of the terminal (S608).

Here, the ECI report indicator, which is sent by the base station by being included in the broadcast message, may be sent by being included in a system configuration description (SCD) message or another broadcast message (new broadcast message), in addition to the AAI-E-MBS-CFG message.

Table 7 shows an exemplary format of E-MBS CFG message.

TABLE 7

| Syntax | Size (Bits) | Notes |
| --- | --- | --- |
| AAI_E-MBS-CFG_Message format ( ) { | | |
| MAC control message type | 8 | |
| ... | | |
| E-MBS connection report indicator (ECI) | 1 | Indicator indicating whether or not the terminal has to report changed information to the base station every time E-MBS connection information being used by the terminal changes. 0: not reporting to the base station when actually receiving E-MBS connection information changes. 1: reporting to the base station when actually receiving E-MBS connection information changes. |
| ... | | |

Table 8 shows an exemplary format of AAI_SCD message.

TABLE 8

| Syntax | Size (Bits) | Notes |
| --- | --- | --- |
| AAI_SCD Message_format ( ) { | | |
| MAC control message type | 8 | |
| ... | | |
| E-MBS connection report indicator (ECI) | 1 | Indicator indicating whether or not the terminal has to report changed information to the base station every time E-MBS connection information being used by the terminal changes. 0: not reporting to the base station when actually receiving E-MBS connection information changes. 1: reporting to the base station when actually receiving E-MBS connection information changes. |
| ... | | |

Here, when the terminal sets on or off the channel change report by the broadcast message, the terminal may report or may not report the changed channel information to the base station when channel information of all of the terminals, which are receiving an E-MBS service within a cell or E-MBS zone, have equally changed.

Channel Change Report Indication to Terminal Via Unicast Message

Hereinafter, a method of setting on or off a channel report for each terminal will be described.

Figure 7:
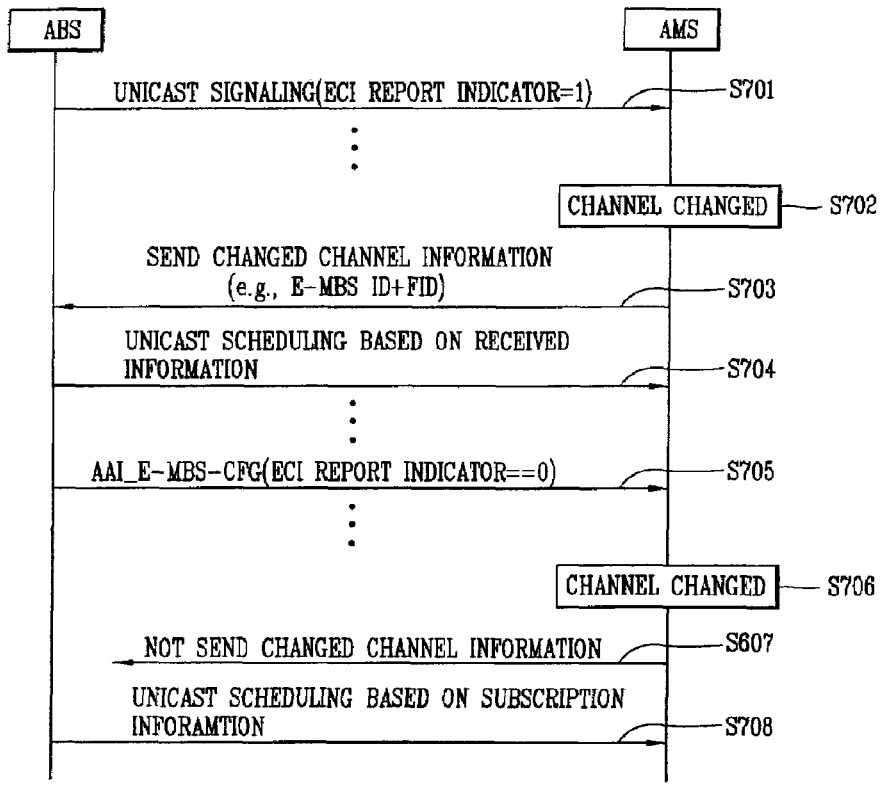
FIG. 7 is a flowchart showing that a base station controls a channel report of a terminal using a unicast signaling in accordance with one exemplary embodiment.

FIG. 7 is a flowchart showing that a base station controls a channel report of a terminal via a unicast signaling in accordance with one exemplary embodiment.

FIG. 7 is the same as FIG. 6 excluding that the broadcast signaling is in place of a unicast signaling (e.g., AAI_ECI-CMD). That is, every procedure is the same each other excluding a type of a message including the E-MBS channel report indicator.

That is, S702-S704 and S706-S708 are the same as S602-S604 and S606-S608 excluding S701 and S705 of sending a unicast message from a base station to a terminal.

Here, since the base station controls the terminal using the unicast signaling, an overhead due to a channel report of the terminal can be reduced.

Figure 8:
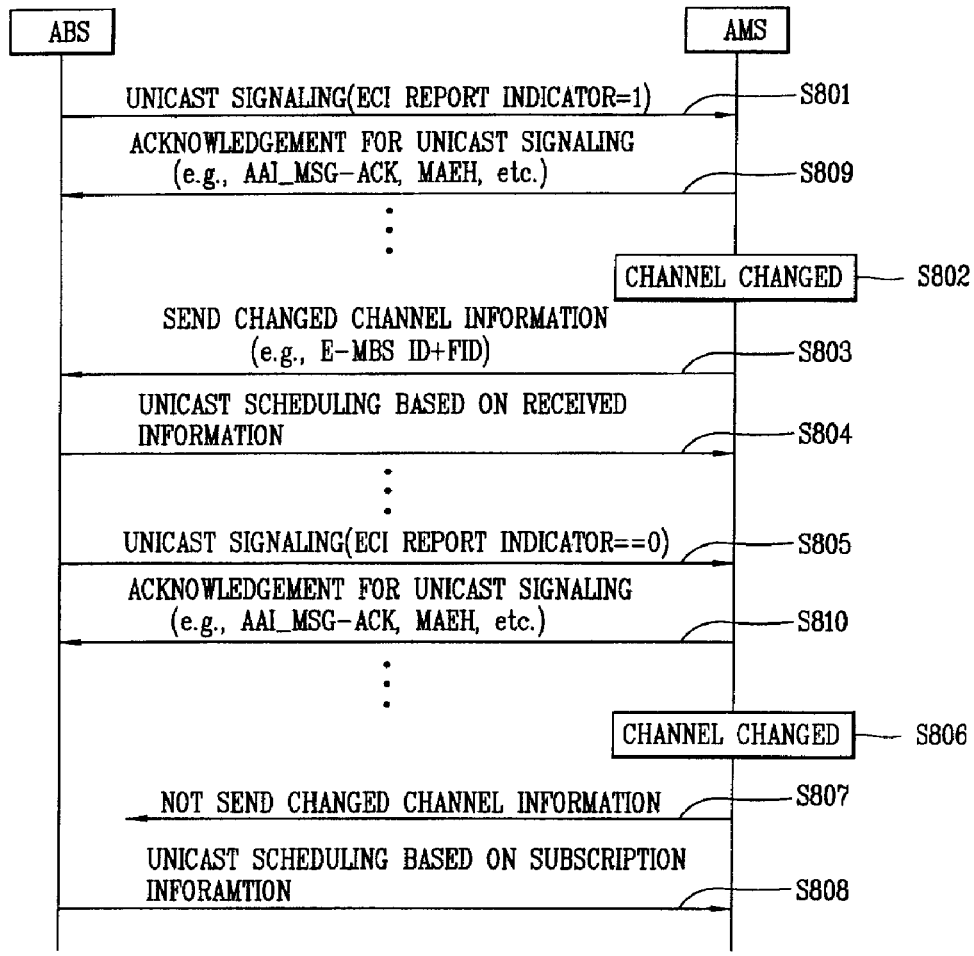
FIG. 8 is a flowchart showing a response of a terminal to the unicast signaling sent by the base station in FIG. 7 in accordance with one exemplary embodiment.

FIG. 8 is a flowchart showing a response of the terminal to the unicast signaling sent by the base station of FIG. 7 in accordance with one exemplary embodiment.

Here, S801-S808 are the same as S701-S708. Upon receiving a unicast signaling including an ECI report indicator from the base station, the terminal may send a response to the base station (S809 and S810).

The base station may request the terminal to send an acknowledgement signaling (e.g., MAC message acknowledgement message (AAI_MSG-ACK), ACK control message, Message ACK extended header, etc.) so as to check whether the terminal has successfully received the unicast signaling for E-MBS control.

After the base station, which sent the unicast signaling, receives the acknowledgement signaling from the terminal, if it is determined that the terminal has successfully received the unicast signaling, the base station may perform an appropriate unicast scheduling.

Here, if the base station does not receive the acknowledgement signal from the terminal, the base station may determine that the terminal has unsuccessfully received the unicast signaling with respect to the channel change report, thereby re-sending the unicast signaling to the terminal for a fast E-MBS control.

That is, the base station may set on or off the channel change report of a specific terminal based upon E-MBS subscription of each terminal belonging to E-MBS zone.

For this, the base station may indicate the channel change report to the terminal via the unicast signaling. Here, the unicast signaling may be sent by using a unicast MAC control message, an extended header, a signaling header and the like.

Also, the unicast signaling may be sent by using the existing message or header, or by defining a new message or header for it.

Table 9 shows an exemplary format of a unicast message that the base station sets on or off the channel change report for each terminal via the unicast signaling.

TABLE 9

| Syntax | Size (Bits) | Notes |
| --- | --- | --- |
| AAI_ECI_CMD Message_format ( ) { MAC control message type | 8 | E-MBS Connection Information (ECI) report command message |
| ... E-MBS connection report indicator (ECI) | 1 | Indicator indicating whether or not the terminal has to report changed information to the base station every time E-MBS connection information being used by the terminal changes. 0: not reporting to the base station when actually receiving E-MBS connection information changes. 1: reporting to the base station when actually receiving E-MBS connection information changes. |

...

Figure 9:
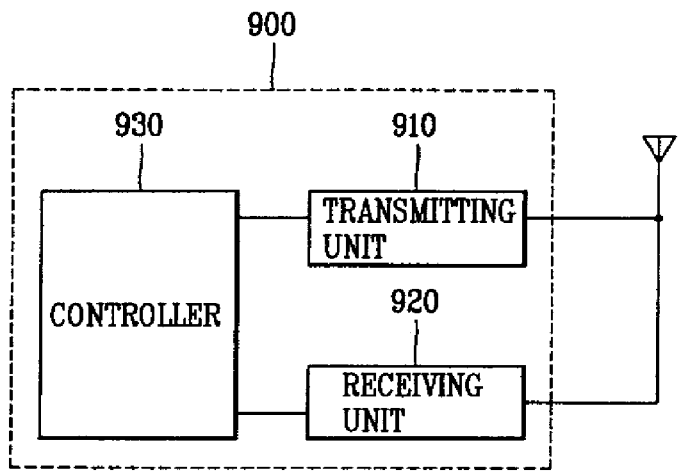
FIG. 9 is an internal block diagram of a terminal in accordance with one exemplary embodiment.

FIG. 9 is an internal block diagram of a terminal in accordance with one exemplary embodiment.

First, a terminal 900 may include a transmitting unit 910, a receiving unit 920 and a controller 930.

In a state where the terminal 900 establishes an E-MBS service connection with a base station to be thus in an E-MBS service connected state, the transmitting unit 910 may send an E-MBS report message including connection information related to E-MBS channels, which the terminal currently receives or intends to receive, to the base station.

The receiving unit 920 may receive an E-MBS response message from the base station responsive to the E-MBS report message.

Also, the receiving unit 920 may receive a DSA response message or unsolicited DSA request message, which includes carrier switching mode information indicating whether the terminal should perform E-MBS channel report, from the base station.

Here, the carrier switching mode information may be information indicating to perform a carrier switching operation with the base station based on unicast available interval information received via a DSA procedure or based on an E-MBS service connection information report.

The controller 930 may perform the carrier switching operation for E-MBS service reception based on the unicast available interval information included in the E-MBS response message received from the base station.

Also, the controller 930 may control the transmitting unit 910 to send the E-MBS report message by including the connection information when the E-MBS channel, which the terminal is monitoring, has changed. Here, the change of the E-MBS channel may indicate the change of a channel to another channel, which is not present in the E-MBS channels being monitored by the terminal.

Also, the controller 930 may control the transmitting unit to send the E-MBS report message to the base station when the carrier switching operation is indicated by the carrier switching mode information based upon the E-MBS service connection information report.

The invention claimed is:

1. A method for operating a terminal for performing a carrier switching operation in a multicarrier system, the method comprising:
    establishing an E-MBS (enhanced-multicast and broadcast service) service connection with a base station;
    sending, to the base station, an E-MBS report message including connection information;
    receiving an E-MBS response message including unicast available interval information based upon the connection information from the base station in response to the E-MBS report message; and
    performing a carrier switching operation for receiving the E-MBS service based upon the unicast available interval information,
    wherein the unicast available interval information is represented by using a plurality of bits,
    wherein each of the plurality of bits indicates whether the terminal is available for E-MBS data scheduling in a primary carrier or a secondary carrier by a unit of frames, and
    wherein the E-MBS report message includes an E-MBS zone ID, a report mode, and an E-MBS connection bitmap, and the E-MBS connection bitmap represents at least one E-MBS service mapped in an ascending order according to a sum of an E-MBS ID and an FID value.

2. The method of claim 1, wherein the connection information is included in the E-MBS report message when the E-MBS channel is changed.

3. The method of claim 2, wherein the change of the E-MBS channel is that the E-MBS channel is changed to a channel other than E-MBS channel that the terminal is monitoring.

4. The method of claim 1, wherein the connection information corresponding to the E-MBS channel intended to be received is included in the E-MBS report message upon a change to another channel other than the E-MBS channel that the terminal is monitoring.

5. The method of claim 1, wherein the connection information is represented in a format of a list of E-MBS service IDs and FIDs, and comprises a field indicating the number of E-MBS IDs and FIDs and a field indicating the E-MBS ID and FID.

6. The method of claim 1, further comprising:
    performing a carrier switching operation between the primary carrier and the secondary carrier for receiving the E-MS service when the E-MBS service connection is established.

7. The method of claim 1, wherein the establishing of the E-MBS service connection with the base station comprises:
    sending a DSA (dynamic service addition) request message to the base station to request for the E-MBS service connection establishment; and receiving a DSA response message from the base station responsive to the DSA request message.

8. The method of claim 7, wherein the DSA response message or the unsolicited DSA request message further includes carrier switching mode information indicating whether or not the terminal should perform the E-MBS channel report.

9. The method of claim 8, wherein the carrier switching mode information is information indicating execution of the carrier switching operation based upon the unicast available interval information or based upon the connection information.

10. The method of claim 9, wherein when the carrier switching mode information indicates the execution of the carrier switching operation based upon the E-MBS service connection information report, the E-MBS report message is sent to the base station.

11. The method of claim 1, wherein the establishing of the E-MBS service connection with the base station comprises:
receiving an unsolicited DSA request message for requesting for the E-MBS service connection establishment from the base station; and
sending a DSA response message to the base station in response to the DSA request message.

12. The method of claim 11, wherein the DSA response message or the unsolicited DSA request message further includes carrier switching mode information indicating whether or not the terminal should perform the E-MBS channel report.

13. The method of claim 12, wherein the carrier switching mode information is information indicating execution of the carrier switching operation based upon the unicast available interval information or based upon the connection information.

14. The method of claim 13, wherein when the carrier switching mode information indicates the execution of the carrier switching operation based upon the E-MBS service connection information report, the E-MBS report message is sent to the base station.

15. The method of claim 1, further comprising receiving a first message including an E-MBS service connection information report indicator from the base station.

16. The method of claim 15, wherein when an E-MBS channel being received by the terminal is changed, the E-MBS service connection information report indicator indicates whether or not the terminal should report the changed channel information to the base station.

17. The method of claim 10, further comprising sending a response to the first message to the base station.

18. The method of claim 1, wherein, when an E-MBS channel is changed to another channel, which is not indicated by channel connection information included in the connection information and reported to the base station, the terminal notifies the base station of connection information related to channels, which are to be received later, as well as connection information related to the changed E-MBS channel, and
wherein the unicast available interval information includes a field indicating a number of unicast available intervals, a start field of a unicast available interval, and an end field of the unicast available interval.

19. A terminal of performing a carrier switching operation in a multicarrier system, the terminal comprising:
a transmitting unit configured to send, to a base station, an E-MBS report message including connection information after establishing an E-MBS service connection with the base station;
a receiving unit configured to receive an E-MBS response message including unicast available interval information based upon the connection information from the base station in response to the E-MBS report message; and
a controller configured to perform a carrier switching operation for receiving E-MBS service based upon the unicast available interval information,
wherein the unicast available interval information is represented by using a plurality of bits,
wherein each of the plurality of bits indicates whether the terminal is available for E-MBS data scheduling in a primary carrier or a secondary carrier by a unit of frames, and
wherein the E-MBS report message includes an E-MBS zone ID, a report mode, and an E-MBS connection bitmap, and the E-MBS connection bitmap represents at least one E-MBS service mapped in an ascending order according to a sum of an E-MBS ID and an FID value.

20. The terminal of claim 19, wherein when an E-MBS channel being monitored by the terminal is changed, the controller controls the transmitting unit to send the E-MBS report message by including the changed channel connection information.

21. The terminal of claim 20, where the change of the E-MBS channel is that the E-MBS channel is changed to another channel other than E-MBS channel that the terminal is monitoring.

22. The terminal of claim 19, wherein the receiving unit receives, from the base station, a DSA response message or unsolicited DSA request message including carrier switching mode information indicating whether or not the terminal should perfoim the E-MBS channel report.

23. The terminal of claim 22, wherein the carrier switching mode information indicates execution of the carrier switching operation based upon the unicast available interval information or based upon the connection information.

* * * * *